Dec. 31, 1957 K. A. KAROW 2,818,469
DIGIT-ABSORBING SELECTOR
Filed Jan. 30, 1956
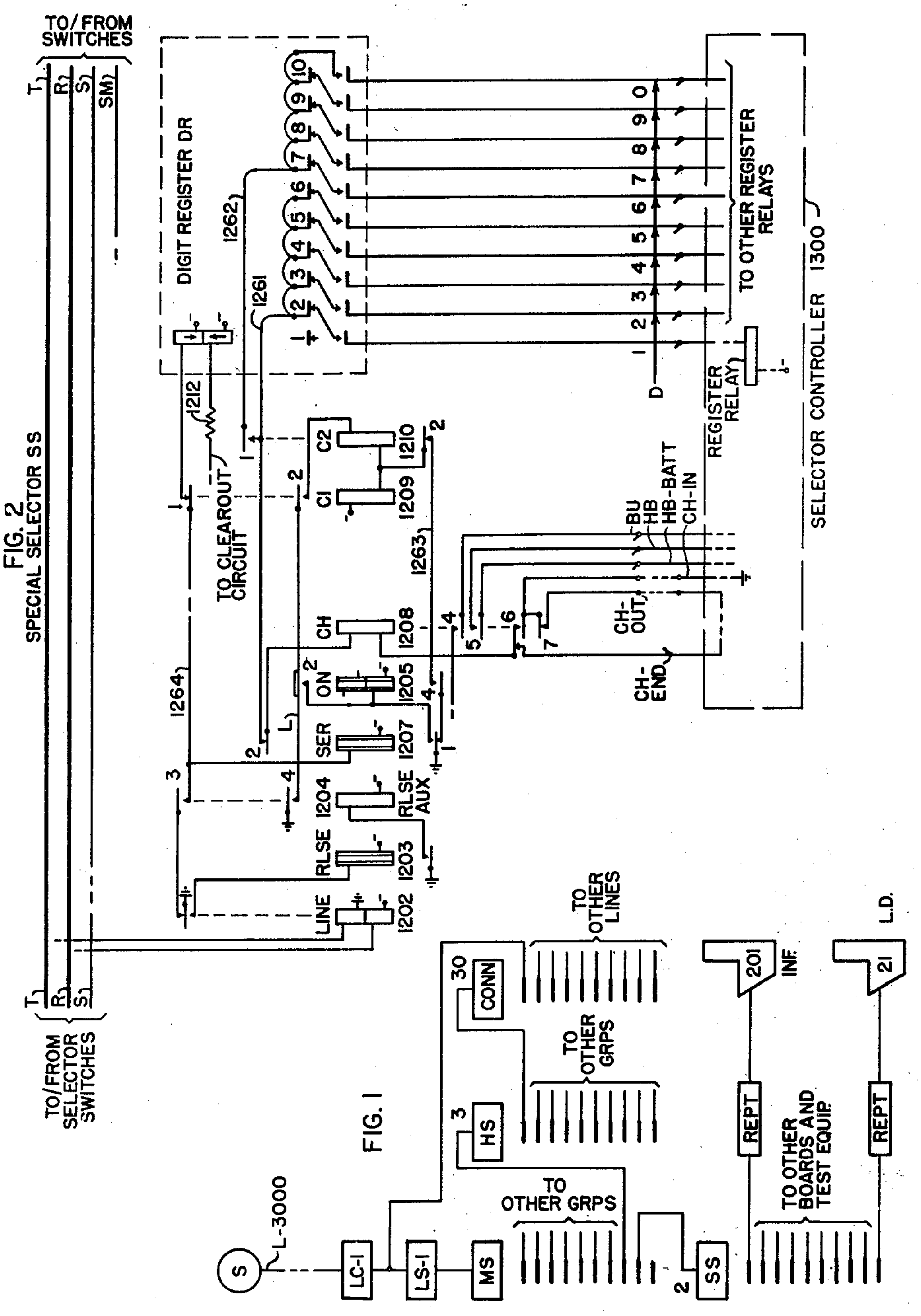
FIG. 1, FIG. 2 SPECIAL SELECTOR SS United States Patent Office 2,818,469

Patented Dec. 31, 1957

2,818,469

DIGIT-ABSORBING SELECTOR

Kenneth A. Karow, Chicago, Ill., assignor to International Telephone and Telegraph Corporation, New York, N. Y., a corporation of Maryland Application January 30, 1956, Serial No. 562,112

7 Claims. (Cl. 179—16)

This invention relates to a digit-absorbing selector suitable for use in an automatic telephone switching system. Its principal object is to provide a simple and economical selector which can readily be adapted to absorb additional digits or not after the critical trunking digit has been dialed.

In telephone exchange areas wherein direct-operated systems are located in the same general area with register-translator systems, difficulty is often encountered in providing uniform numbering throughout the area. This is especially true if the accepted area-numbering plan is in accordance with register-translator arrangements which, to start trunking operations, require the receipt of two-digit or three-digit numbers which are differentiated only by the pre-final digit. Some examples of such numbers include special service inter-toll trunk group numbers, such as 12, 22, 121, 131, etc.

Heretofore, in direct-operated systems arranged to operate in areas wherein one or more digits are dialed after the critical trunking digit has been dialed, it was common practice to arrange the repeaters of the above noted trunk groups with digit-absorbing arrangements for absorbing any additional non-critical digits. This arrangement, however, became uneconomical when the selectors served a sizable number of small trunk groups, as each repeater therein required the digit-absorbing arrangement.

Other known arrangements permitted the dialing of any additional digits over the established connection irrespective of whether or not the operator had answered, often resulting in undesirable clicks. In register-sender systems, however, this practice could not be permitted as quick answer by an operator would cause a stop-dial indication to be sent to the sender resulting in an alarm condition.

According to the present invention, the selector disclosed herein, being of the type employed in direct-operated systems, is arranged to receive and record certain critical or pre-final digits of the noted three-digit trunk-group number and to withhold the corresponding trunking operation until an additional digit is dialed.

Such arrangement employs control circuits which after receiving and recording the critical digit, maintain the setting of the digit register and hold the trunking operation in abeyance until the noted additional digit is dialed, whereupon the register setting becomes effective to permit the hunting or trunking operation to progress in the normal manner.

A related feature resides in a digit-discriminating arrangement which, following the dialing of certain other digits, conditions the selector to begin trunking operations without awaiting the noted additional digit.

The above-mentioned and other features and objects of this invention and the manner of attaining them will become more apparent, and the invention itself will be best understood, by reference to the following description of an embodiment of the invention taken in conjunction with the accompanying drawings comprising Figs. 1 and 2, wherein:

Fig. 1 shows a single-line trunking diagram of a switching system embodying the invention; and Fig. 2 shows in partial circuit detail, a digit-absorbing selector arranged to provide both immediate trunking and delayed trunking operations.

It has been chosen to disclose the invention as embodied in a direct-operated telephone system of the type disclosed in the application of R. W. Hutton et al., Serial No. 359,761, filed June 5, 1953, for a Multi-Group Direct-Access Crossbar Telephone Switching System. Except as hereinafter pointed out, the digit-absorbing selector of the present invention is similar to the selector of the noted Hutton et al. application.

Referring now in particular to Fig. 1 of the drawings, the general operation of the system embodying the invention will be described.

If a subscriber S at a local line, such as line L–3000, desires to call another line, the usual operation of line circuit LC–1 and line switch LS–1 causes a calling connection to be extended to the first or thousands selector MS. Responsive to the dialing of the thousands digit of the directory number of the desired line, a connection is extended through the thousands selector MS to an idle hundreds selector HS, which upon receiving the hundreds digit, further extends the connection to an idle connector CONN serving the called line. Following the dialing of the tens and units digits of the directory number in the connector, a connection from the calling line to the called line is completed in the well-known manner.

In the event the subscriber at line L–3000 desires to call a special service board such as information or long distance, the first digit of the special service number is dialed in the seized thousands selector MS, and operations occur to cause the connection to be extended therethrough to the special selector SS. In the event the subscriber desires a three-digit number, such as information, the remaining two digits of the number are dialed and operations occur is special selector SS to extend the connection to the information board. In the event the subscriber desires the long-distance operator, a single digit is dialed in selector SS and operations occur therein to extend the connection to the long-distance board.

It will be observed that selector SS is arranged to respond to the dialing of either one or two digits to extend a first or a second type of connection. The operation of such selector in responding to one or two digits will be described in detail with reference to Fig. 2 of the drawings.

Referring now in particular to Fig. 2 of the drawings, the detailed operation of special selector SS in responding to the receipt of one or two digits to extend connections to idle trunks in respective ones of desired trunk groups will be described.

As hereinbefore pointed out, special selector SS is generally similar to selector 1200 of the noted Hutton et al. application. However, the chain relay circuit of the Hutton et al. selector is modified and relays 1209 and 1210, together with associated contacts, have been added.

Responsive to the seizure of special selector SS in response to the dialing of the digit 2 of the special service number desired, line relay 1202, release relay 1203, and release auxiliary relay 1204 operate to prepare selector SS for receipt of digits.

As hereinbefore noted, selector SS is arranged to start trunking operations after the receipt of a single digit or to withhold such trunking operation until the receipt of a second digit. The description of the selector in starting trunking operations in response to a single digit will now be described.

Assuming the calling subscriber dials the second and last digit of the long-distant operator number 21, line relay 1202 restores momentarily for the single impulse in the digit 1 and delivers a ground-induced impulse to wire 1264 through make contacts 3 of relay 1204 which held operated as it is controlled by slow-restoring relay 1203. This impulse is transmitted to the battery-connected winding of series relay 1207 and through break contacts 1 of counter control relay C1 to the battery-connected operate winding of digit register DR.

Series relay 1207 operates and at its make contacts 1, extends ground potential to the lower winding of off-normal relay 1205, and at its break contacts 2, opens the operate circuit of chain relay 1208.

Off-normal relay 1205 operates and as described in the Hutton et al. disclosure, locks operated. Contacts 4 of relay 1205 prepare an operate circuit for relay 1209.

Digit register DR responds to the single ground impulse appearing on wire 1264 by operating its contact set 1, causing the make and break contacts thereof to shift to their alternate position.

On completion of the dialing of the digit, line relay 1202 comes to rest operated and removes ground from the winding of the digit register DR and from the winding of series relay 1207. Series relay 1207 restores and at its break contacts 1 extends ground potential through make contacts 4 of relay 1205, over wire 1263, and through break contacts 2 of counter-control relay C2 to the battery-connected winding of counter-control relay C1. At the same time, its break contacts 2 reclose a point in the operate circuit of chain relay 1208.

Counter-control relay C1 operates and at its make contacts 2 extends the ground potential appearing on lock wire L to the winding of the counter-control relay C2, preventing its operation as ground now appears on both sides of its winding. Break contacts 1 of relay 1209 open the operate circuit of digit register DR preventing it from reoperating in the event subsequent digits are dialed.

At such time, an operate circuit for chain relay 1208 is completed. This circuit is from ground on the chain-in wire CH–IN of the selector controller 1300 (such controller being similar to the controller of the noted Hutton et al. application excepting that the resistance-battery normally appearing on the CH–IN wire is now replaced by ground) through chain contacts on certain other selectors served by controller 1300, through make contacts 6 and break contacts 7 of chain relay 1208 to the chain-out wire CH–OUT, through any other selectors of the same group, through contacts in the selector controller 1300 (not shown) to the chain-end wire CH–END and through break contacts 6 of relay 1208 to the winding thereof. The other side of the winding of the chain relay is connected to battery through break contacts 2 of series relay 1207, wire 1261, break contacts 2 and make contacts 1 of digit register DR to the digit wire D1 extending to the register relay of selector controller 1300. This chain differs from the chain circuit shown in the noted Hutton et al. application in that there, the chain relay is operated independently of the digit register DR and contacts thereon thereafter ground such digit wires through the register contacts.

Chain relay 1208 operates and at its contacts 6 and 7 individualizes selector SS with the common control apparatus. Its make contacts 4 and 5 associate the common wires of the controller with the selector SS in the manner described in the noted Hutton et al. application.

Operations thereafter occur in the selector controller to cause the calling connection to be extended through selector SS to the repeater REPT associated with the long-distance operator. The chain circuit is thereafter opened, restoring the common control apparatus to normal use.

On completion of the conversation with the long-distance operator, the calling subscriber disconnects and operations occur in selector SS generally as described in the Hutton et al. disclosure which returns it to normal idle use.

The operation of selector SS in responding to three-digit special service numbers will now be described.

Assuming the second digit of the number 201 is dialed in selector SS, line relay 1202 restores and reoperates to deliver ten ground-induced impulses to wire 1264 to thereby operate digit register DR to cause it to actuate its contact sets successively from the illustrated position to the tenth position, this position connecting digit wire DO to wire 1262. At the same time, series relay 1207 operates and is held operated during the dialing of such digit, resulting in the hereinbefore described operation of relay 1205.

Following the dialing of such digit, line relay 1202 comes to rest operated, and open-circuits the operate winding of series relay 1207 which restores and at its make contacts 1 extends ground potential to wire 1263 as described hereinbefore to operate counter control relay C1, which opens the operate circuit of register DR. At the same time, its make contacts 2 prepare a partial operate circuit for chain relay 1208.

On completion of the dialing of the digit 0, no operate circuit for the chain relay 1208 is closed as wire 1262, associated with the only digit wire selected, is open at make contacts 1 of relay 1210. At such time, selector SS has recorded the first digit dialed therein and is withholding trunking operations until such time that an additional digit is dialed.

Following the dialing of the digit 0 of number 201, the called subscriber thereafter dials the next succeeding digit 1. In response to such digit, line relay 1202 momentarily restores to transmit one ground-induced impulse to the winding of series relay 1207 and to wire 1264. At such time, contacts 1 of counter-control relay C1 maintain the operate circuit of digit register DR open, but series relay 1207 operates and at its make contacts 1 removes the ground from wire 1263.

With ground removed from wire 1263, ground on lock lead L is now effective to operate counter-control relays C1 and C2 in series through make contacts 2 of relay 1209. Responsive to the operation of control relay C2, make contacts 1 thereon connect wire 1262 to wire 1261 and at break contacts 2, opens the initial operate circuit of counter-control relay C1 to prevent the restoration of the series relay from restoring relay C2.

A short time thereafter, series relay 1207 restores and at its make-break contacts 2, completes an operate circuit for chain relay 1208. At such time, digit wire DO, corresponding to the first digit dialed is connected through make contacts 10 of digit register DR and the jumpers on contacts 7 to 10 thereof to wire 1262 which is connected to one side of the chain relay 1208 through break contacts 2 of series relay 1207.

In the event the selector controller is idle, ground appearing on the chain-in wire causes chain relay 1208 to operate and as hereinbefore described to become individualized therewith. The controller thereafter responds to the digit wire marking to extend the connection to an idle trunk in the group extending to the toll operator.

The operation of the selector SS in responding to a "switch-through" indication is generally as described in the noted Hutton et al. application, the release auxiliary relay 1204 permitting counter-control relays C1 and C2 to restore.

While not shown, it is understood that additional digits could be dialed after the critical digit has been dialed and before trunking operations occur, such arrangement increasing the number of absorbed digits from one to two. Further, arrangements similar to those shown in the noted Hutton et al. selector could be provided for absorbing the initial digit 1, as desired.

While I have described above the principles of my invention in connection with specific apparatus, it is to be clearly understood that this description is made only by way of example and not as limitation to the scope of my invention.

I claim:

1. A group selector for use in a switching system to connect an associated incoming trunk to an idle trunk in any desired one of a number of numerical groups of outgoing trunks indexed by respective digit values, including register means responsive to a digit series of pulses received over the incoming trunk indexing a numerical group to record the digit value thereof, the selector further including automatic switching apparatus and means for operating it responsive to the receipt of the recorded digit information to select an idle trunk in the indexed numerical group and to connect the said incoming trunk to such selected trunk, delay means in the selector for holding in abeyance the said operation of the automatic switching apparatus, and means responsive to the receipt over the incoming trunk of succeeding digit information for nullifying the said delay means.

2. A group selector according to claim 1, including selective means for rendering the said delay means operative or not according to the digit value recorded by the said register means.

3. A group selector according to claim 1, including means for rendering the said nullifying means independent of the digit value of the said succeeding digit information.

4. A group selector according to caim 1 wherein the said delay means for holding in abeyance the operation of the automatic switching includes means for rendering the register inoperative to the receipt over the trunk of succeeding digit information.

5. A group selector according to claim 1 wherein digit wires correspond respectively to the numerical groups of outgoing trunks and are selectively marked by the registering means, and wherein the indexing of a numerical group of trunks is according to the marking of the corresponding one of the digit wires.

6. A group selector according to claim 5 wherein the received digit information for operating the automatic switching apparatus is in accordance with the said marking of the digit wires, and wherein the operativeness of the automatic switching apparatus is according to the effectiveness of the digit wire marking as determined by the delay means and the nullifying means.

7. In combination, a number of group selectors each according to claim 1 for giving their respective incoming trunks access in common to the said outgoing trunks, the said means for operating the automatic switching apparatus including control apparatus common to the group selectors, individualizing means in any selector responsive to the receipt of the recorded digit information therein for temporarily individualizing the common control apparatus therewith, and the said delay means for holding the operation of the automatic switching apparatus in abeyance disabling the individualizing means.

No references cited.